(12) United States Patent
Basu et al.

(10) Patent No.: US 11,941,647 B2
(45) Date of Patent: Mar. 26, 2024

(54) STORAGE AND TRANSMISSION OF PRIORITY RULES AND SCORES IN DATA MANAGEMENT SYSTEM

(71) Applicant: iHeartMedia Management Services, Inc., San Antonio, TX (US)

(72) Inventors: Kohinoor Basu, Aliso Viejo, CA (US); Angel Barnachea Chua, Aliso Viejo, CA (US); Matthew M. Ferry, Eastvale, CA (US); Scott Arthur Roberts, Irvine, CA (US)

(73) Assignee: IHEARTMEDIA MANAGEMENT SERVICES, INC., San Antonio, TX (US)

( * ) Notice: Subject to any disclaimer, the term of this patent is extended or adjusted under 35 U.S.C. 154(b) by 102 days.

(21) Appl. No.: 17/665,016

(22) Filed: Feb. 4, 2022

(65) Prior Publication Data
US 2022/0156765 A1    May 19, 2022

Related U.S. Application Data

(63) Continuation of application No. 15/092,908, filed on Apr. 7, 2016, now Pat. No. 11,244,325, which is a continuation of application No. 12/642,825, filed on Dec. 20, 2009, now Pat. No. 9,311,649.

(51) Int. Cl.
| | |
|---|---|
| *G06Q 30/0201* | (2023.01) |
| *G06F 16/2455* | (2019.01) |
| *G06Q 10/06* | (2023.01) |
| *G06Q 30/02* | (2023.01) |

(52) U.S. Cl.
CPC ... *G06Q 30/0201* (2013.01); *G06F 16/24564* (2019.01); *G06Q 10/06* (2013.01); *G06Q 30/02* (2013.01)

(58) Field of Classification Search
None
See application file for complete search history.

(56) References Cited

U.S. PATENT DOCUMENTS

| | | |
|---|---|---|
| 6,035,307 A | 3/2000 | Martin |
| 6,338,043 B1 | 1/2002 | Miller |
| 6,513,065 B1 | 1/2003 | Hafez |
| 6,615,258 B1 | 9/2003 | Barry |

(Continued)

*Primary Examiner* — Kim T Nguyen
(74) *Attorney, Agent, or Firm* — Harness, Dickey & Pierce, P.L.C.

(57) ABSTRACT

A data processing system includes a processor and associated memory implementing an enterprise data management (EDM) module configured to interact with an enterprise management system. A storage device coupled to the processor, implements an enterprise data management (EDM) database, which stores priority rules used to determine priority scores associated with a plurality of different entities associated with entity records. A communications interface coupled to the processor, transmits the priority rules, to an enterprise management system, and receives priority scores of individual entities, determined based on the priority rules, from the enterprise management system. The priority scores of the individual entities are stored in the EDM database in association with the priority rules, and the EDM module matches the entity records to entities based, at least in part, on the priority scores of the individual entities.

20 Claims, 7 Drawing Sheets

(56) References Cited

U.S. PATENT DOCUMENTS

| | | |
|---|---|---|
| 6,718,551 B1 | 4/2004 | Swix |
| 6,912,549 B2 | 6/2005 | Rotter |
| 6,937,996 B1 | 8/2005 | Forsythe |
| 7,941,491 B2* | 5/2011 | Sood .................... H04L 51/212 709/206 |
| 9,311,649 B2* | 4/2016 | Basu ................... G06F 16/2365 |
| 11,675,824 B2* | 6/2023 | Shirwadkar ............ G06F 16/36 707/737 |
| 11,675,912 B2* | 6/2023 | Light ..................... G06N 20/00 726/25 |
| 11,689,555 B2* | 6/2023 | Cai ....................... G06F 21/577 726/25 |
| 11,693,890 B2* | 7/2023 | Senjalia ................ G06F 16/288 707/722 |
| 2003/0046280 A1 | 3/2003 | Rotter |
| 2004/0148409 A1* | 7/2004 | Davis ................... H04L 63/105 709/229 |
| 2007/0006264 A1 | 1/2007 | Steelberg et al. |
| 2007/0130015 A1* | 6/2007 | Starr .................... H04N 21/858 705/14.46 |
| 2008/0270458 A1* | 10/2008 | Gvelesiani ............ G06F 16/288 |
| 2011/0071894 A1* | 3/2011 | Nesamoney ....... G06Q 30/0269 705/14.66 |
| 2022/0156765 A1* | 5/2022 | Basu .................. G06Q 30/0201 |

* cited by examiner

STORAGE AND TRANSMISSION OF PRIORITY RULES AND SCORES IN DATA MANAGEMENT SYSTEM

CROSS REFERENCE TO RELATED APPLICATIONS

The present U.S. Utility Patent Application claims priority pursuant to 35 U.S.C. § 120 as a continuation of U.S. utility application Ser. No. 15/092,908 entitled "System and Method for Managing Media Advertising Enterprise Data," filed Apr. 7, 2016, scheduled to issue as U.S. Pat. No. 11,244,325 on Feb. 8, 2022, which is a continuation of U.S. utility application Ser. No. 12/642,825 entitled "System and Method for Managing Media Advertising Enterprise Data," filed Dec. 20, 2009, now issued as U.S. Pat. No. 9,311,649 on Apr. 12, 2016, which are hereby incorporated herein by reference in their entirety and made part of the present U.S. Utility Patent Application for all purposes.

TECHNICAL FIELD

Embodiments relate in general to the field of computers and similar technologies and, in particular, to software utilized in this field. Embodiments are generally related to enterprise data-processing methods and systems. In addition, embodiments relate to the management of advertising data.

BACKGROUND OF THE INVENTION

Advertising forms an important part of broadcast programming including broadcast video (e.g., television), radio, and printed media. Advertising management systems are distributed systems where local entities create and manage advertiser and agency content and records. Such systems often possess a large number of duplicate advertiser and agency records in their database(s). Integrating such distributed systems into an enterprise environment can create duplicate entries, compatibility issues, connection difficulties, redundancy issues, and other significant inefficiencies.

Many distributed and disconnected legacy systems utilized by media outlets typically include a large number of duplicate advertiser and agency records. One of the main problems associated with conventional techniques for managing such records is the lack of effective tools for scoring, evaluating, and comparing data with respect to a single enterprise. For example, consider a user belonging to a market associated with an enterprise that creates a new advertiser named 'Baja Fresh' and another user who belongs to another market associated with the same enterprise creates a new advertiser 'Baja Grill' with a slight variation in the name (i.e., "Baja"). Technically, both these advertiser names refer to the same master advertiser, which is 'Baja Fresh'. Hence, it is important to have a single instance of an advertiser and not multiple duplicates for management and reporting purposes. Another problem associated with conventional advertising techniques involves management and reporting of large amounts of data by local users, which is time consuming and inefficient.

Based on the foregoing, it is believed that a need exists for an improved system and method for managing media advertising enterprise data. A need also exists for an improved method for configuring a set of rules to determine a score function with respect to the advertising data, as described in greater detail herein.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved enterprise data-processing system and method.

It is another aspect of the disclosed embodiments to provide for an improved system and method for managing media advertising enterprise data.

It is a further aspect of the disclosed embodiments to provide for an improved method and system for configuring a set of rules to determine a score function with respect to the advertising data.

The aforementioned aspects and other objectives and advantages can now be achieved as described herein. A system and method for managing media advertising enterprise data is disclosed herein. An EDM (Enterprise Data Management) module can be configured to include a set of rules (e.g., revenue rule, urgency rule, and workflow state rule) at an enterprise level to manage disparate and disconnected records associated with an entity (e.g., advertiser, agency, etc.). A scoring function with respect to each record can be calculated based on the aforementioned set of rules to determine a highest priority. The rules in association with the scoring function can be stored locally in an EDM database. A matching process can then be performed to accurately match similar records regardless of manual input, location, and format of the records in a distributed system. Each unmatched record can be assigned to a parent enterprise entity. Such an optimization technique can be utilized to interactively manage and report records at an enterprise level in a simple and efficient manner.

A newly created entity can be matched by the EDM module and assigned a unique enterprise ID. The entity records can be stored in the EDM database. The rules can be defined based on key factors such as, for example, the amount of revenue, the recentness of the order, and a workflow state in order to determine the scoring function with respect to the unmatched record. The EDM module can be configured to automatically assign the highest priority record to a particular user in order to ensure that the most important entities are matched first within the enterprise reporting. The revenue rule can affect the scoring function associated with the entity based on configurable revenue parameters such as, for example, minimum revenue, maximum revenue, minimum score, maximum score, weighting percentage, and so forth. The revenue score can be calculated utilizing total order amounts between the minimum and maximum revenue. In some embodiments, an administrator can be authorized to change such parameters based on a particular business priority.

The urgency rule represents the recentness of the order/proposal based on both past and future dates and the most recently scheduled order can receive a higher urgency score. Urgency parameters that can impact the scoring of the entity include, for example, minimum date, maximum date, minimum score, maximum score, weighting percentage, etc. The workflow state represents the current state of the order/proposal in the workflow such as, for example, pending client approval, pending management approval, etc. If an advertiser possesses more than one order that falls within an urgency time-frame, each order can be scored separately and summed.

The score associated with the entity can be calculated based on the rules provided in a request message by a hub, which is described in greater detail herein. The calculated score along with other entity information can be sent back to the hub in a response message. A user interface, in associate with the EDM module, can serve to provide a unique and innovative technique for storing, retrieving, and manipulating data from databases containing media-related data. By utilizing such databases with a simplified storage and retrieval protocol, the data contained therein can be effectively manipulated in real time. The user interface provides access to the EDM module in a simple and straightforward manner, thereby significantly reducing training time.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Figure 1:
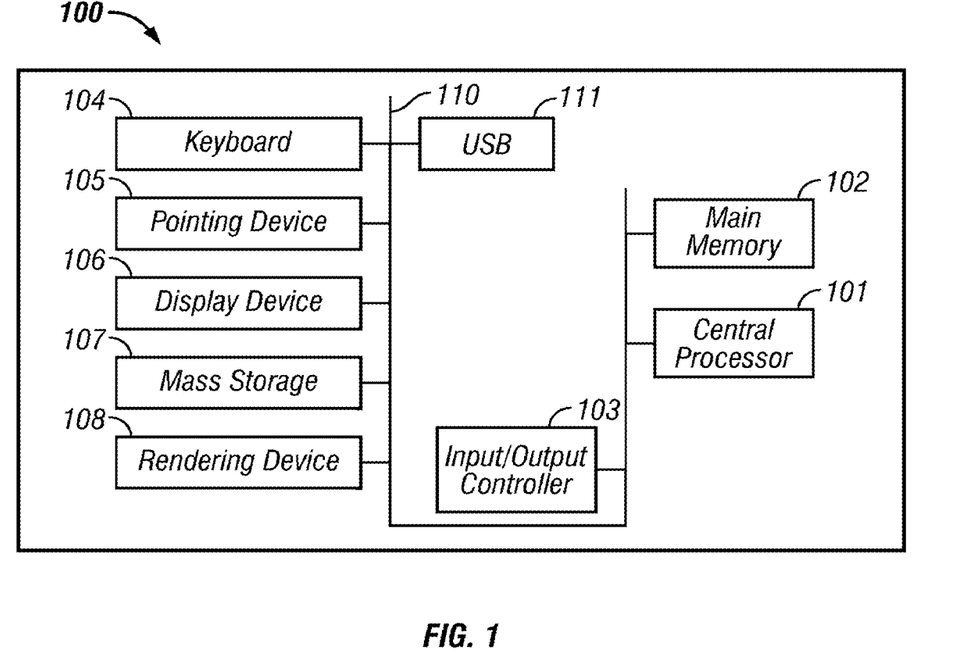
FIG. 1 illustrates a schematic view of a data-processing system in which an embodiment may be implemented.
Figure 2:
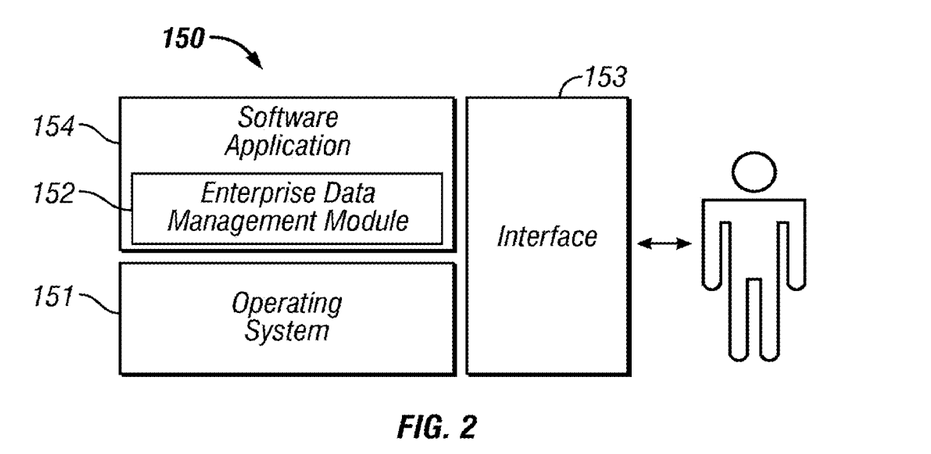
FIG. 2 illustrates a schematic view of a software system including an operating system, application software, and a user interface for carrying out an embodiment.
Figure 3:
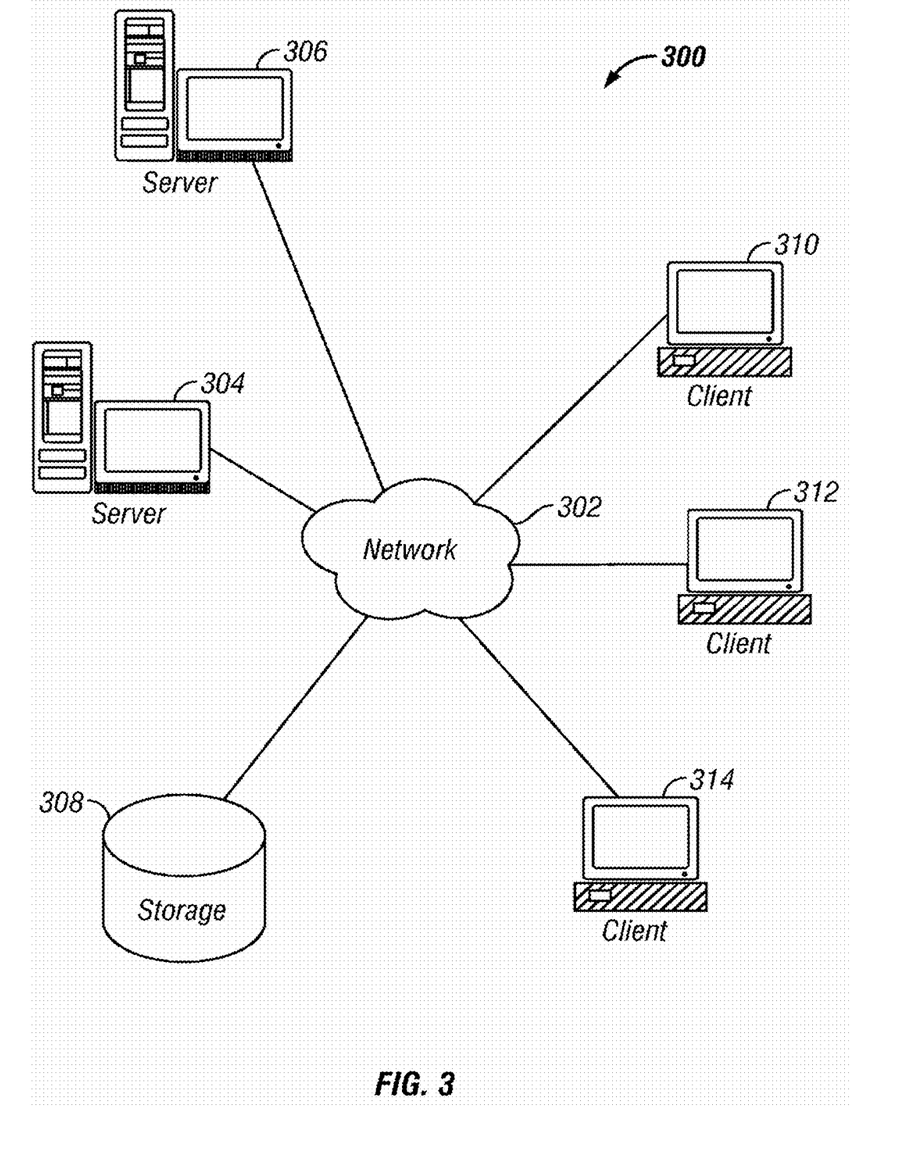
FIG. 3 illustrates a graphical representation of a network of data-processing systems in which aspects of the disclosed embodiments may be implemented.

FIGS. 1-3 are provided as exemplary diagrams of data-processing environments in which embodiments of the present invention may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 1, the disclosed embodiments may be implemented in the context of a data-processing system 100 that includes, for example, a central processor 101, a main memory 102, an input/output controller 103, a keyboard 104, an input device 105 (e.g., a pointing device such as a mouse, track ball, pen device, etc.), a display device 106, a mass storage 107 (e.g., a hard disk), and a USB (Universal Serial Bus) peripheral connection 111. Additional input/output devices, such as a rendering device 108 (e.g., printer, scanner, fax machine, etc.), for example, may be associated with the data-processing system 100 as desired. As illustrated, the various components of data-processing system 100 can communicate electronically through a system bus 110 or similar architecture. The system bus 110 may be, for example, a subsystem that transfers data between, for example, computer components within data-processing system 100 or to and from other data-processing devices, components, computers, etc.

FIG. 2 illustrates a computer software system 150 for directing the operation of the data-processing system 100 depicted in FIG. 1. Software application 154, stored in main memory 102 and on mass storage 107, generally includes a kernel or operating system 151 and a shell or interface 153. One or more application programs, such as software application 154, may be "loaded" (i.e., transferred from mass storage 107 into the main memory 102) for execution by the data-processing system 100. The data-processing system 100 receives user commands and data through user interface 153; these inputs may then be acted upon by the data-processing system 100 in accordance with instructions from operating system module 151 and/or software application 154.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module), and which includes source code that actually implements the routines in the module. The term module may also simply refer to an application such as a computer program designed to assist in the performance of a specific task such as word processing, accounting, inventory management, etc.

The interface 153, which is preferably a graphical user interface (GUI), can serve to display results, whereupon a user may supply additional inputs or terminate a particular session. In some embodiments, operating system 151 and interface 153 can be implemented in the context of a "Windows" system. It can be appreciated, of course, that other types of operating systems and interfaces may be alternatively utilized. For example, rather than a traditional "Windows" system, other operation systems such as, for example, Linux may also be employed with respect to operating system 151 and interface 153. The software application 154 can include, for example, an EDM module 152 for managing media advertising enterprise data in a business management application. The EDM module 152 generally configures a set of rules at an enterprise level to manage disparate and disconnected records. EDM module 152 can include instructions such as those of method 500 and 700 respectively discussed herein with respect to FIG. 5 and FIG. 7.

FIG. 3 illustrates a graphical representation of a network of data-processing systems in which aspects of the disclosed embodiments may be implemented. Network data-processing system 300 is a network of computers in which embodiments of the present invention may be implemented. Network data-processing system 300 contains network 302, which is the medium used to provide communications links between various devices and computers connected together within network data-processing apparatus 300. Network 302 may include connections such as wire, wireless communication links, or fiber optic cables.

In the depicted example, server 304 and server 306 connect to and communicate with network 302 along with storage unit 308 (e.g., a memory, database, etc.). In addition, clients 310, 312, and 314 connect to and communicate with network 302. These clients 310, 312, and 314 may be, for example, personal computers or network computers. Data-processing system 100 depicted in FIG. 1 can be, for example, a client such as client 310, 312, and/or 314. Alternatively, data-processing system 100 can be implemented as a server such as servers 304 and/or 306, depending upon design considerations.

In the depicted example, server 304 provides data such as boot files, operating system images, and applications to clients 310, 312, and 314. Clients 310, 312, and 314 are clients to server 304 in this example. Network data-processing system 300 may include additional servers, clients, and other devices not shown. Specifically, clients may connect to any member of a network of servers which provide equivalent content.

In the depicted example, network data-processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational, and other computer systems that route data and messages. Of course, network data-processing system 300 also may be implemented as a number of different types of networks such as, for example, an intranet, a local area network (LAN), or a wide area network (WAN).

FIGS. 1-3 are thus intended as an example and not as an architectural limitation with respect to particular embodiments. Such embodiments, however, are not limited to any particular application or any particular computing or data-processing environment. Instead, those skilled in the art will appreciate that the disclosed system and method may be advantageously applied to a variety of system and application software. Moreover, the present invention may be embodied on a variety of different computing platforms, including Macintosh, UNIX, LINUX, and the like.

Figure 4:
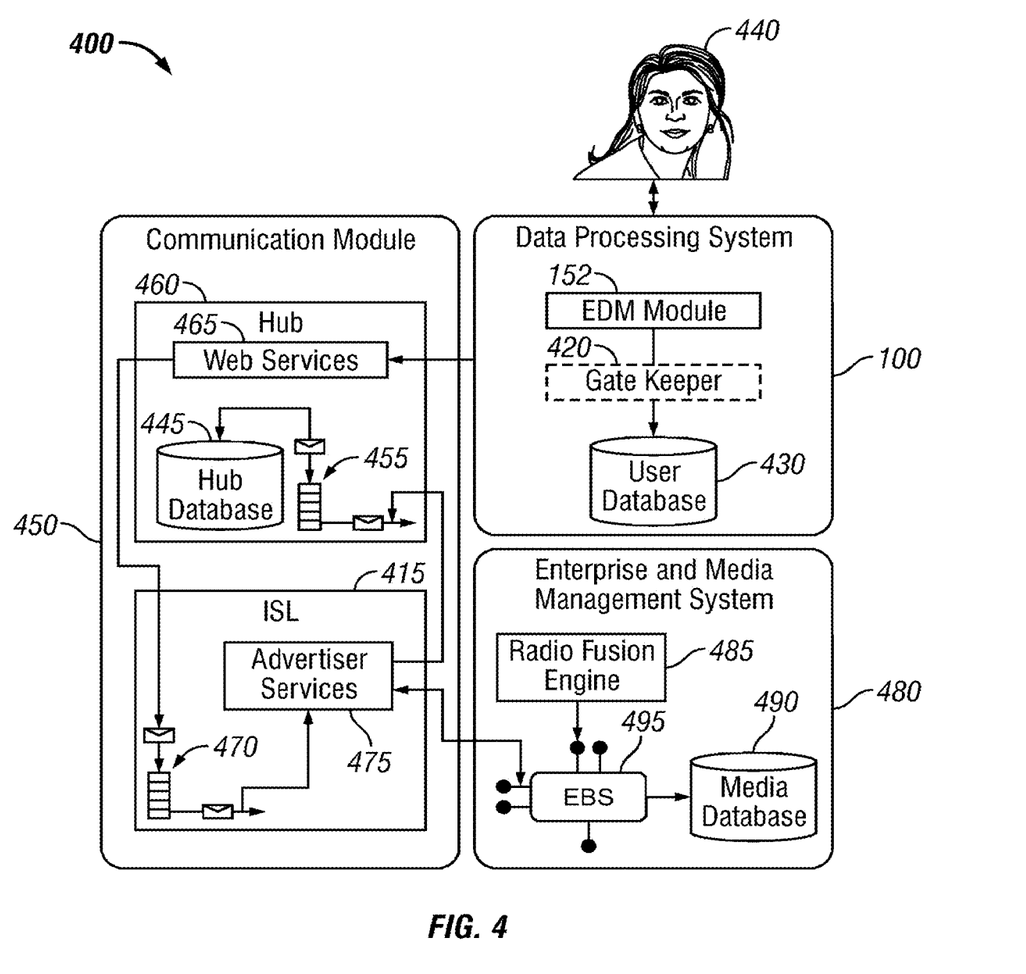
FIG. 4 illustrates a block diagram of a media advertising enterprise data management system, in accordance with the disclosed embodiments.

FIG. 4 illustrates a block diagram of a media advertising EDM system 400, in accordance with the disclosed embodiments. Note that in FIGS. 1-8, identical or similar blocks are generally indicated by identical reference numerals. The EDM system 400 matches a market entity to a central enterprise entity to permit consolidated reporting at an enterprise level. Note that the term "entity" refers generally to organizations such as, for example, an "advertiser" or an "agency". The term "entities" can be utilized herein to describe situations that affect both advertisers and agencies with respect to, for example, unmatched entities.

The EDM system 400 can incorporate a data-processing system such as, for example, the data processing system 100, along with a communication module 450 and an enterprise and media management system 480. The data processing system 100 can provide access to a set of users 440 with respect to the enterprise and media management system 480. Data-processing system 100 depicted in FIG. 1 can be, for example, a server. Other devices such as, for example, desktops, network devices, palmtops, mobile phones, etc., may also be included in the enterprise data management system 400 as service providers, depending upon design considerations.

The data-processing system 100 can be configured to include an EDM module 152 and a user database 430. The EDM module 152 can interact with and manage data in various enterprise and media applications and management solutions. The enterprise and media management system 480 can be, for example, a VIERO®, a TransACT™, or FUSION platform that provide just-in-time advertising and extensibility services. The EDM module 152 can run data-processing instructions under the credentials of a user logged operating system and utilize an integrated login configuration in order to authenticate a user such as, for example, user 440. Such a module can thus include instructions, which are stored in a computer memory and then retrieved and executed by, for example, a data-processing system such as, for example the system 100 depicted in FIG. 1.

The EDM application 152 can authenticate the user 440 by accessing a domain login and security privilege information with respect to the user 440. The domain login and security privilege information can be locally stored in the user database 430. When the user 440 accesses the system 400, the EDM module 152 can automatically validate the domain login of the logged user against the domain user name stored in the user database 430 via a gate keeper service 420 and then determine if the user 440 is authorized to access the EDM module 152. If the domain user name associated with the user 440 exists, the EDM module 152 validates and provides access to the required application.

The communication module 450 provides enterprise matching of distributed and disconnected entity records from user inputs. Such a process can accurately match the similar entity records regardless of the manual input, the location, and format of the records in the distributed system 480. The system 400 organizes the disparate records utilizing a set of rules and a matching process to efficiently manage unorganized, un-useable records in the enterprise record set. The system 400 therefore provides a variety of capabilities for managing and reporting advertising records at the enterprise level. The entire process can begin with an initial set of user inputs and then adapt and learn behavior as users interact with the system 400.

The communication module 450 generally includes a hub 460 associated with a hub database 445, hub services 465, and a hub queue 455. Note that the hub 460 can be, for example, a network hub and/or a repeater hub for connecting multiple twisted pair or fiber optic Ethernet devices together and thus forcing such devices and components to function as a single network segment. Hubs can operate at, for example, the physical layer (layer 1) of an OSI model and can form a multiport repeater. Repeater hubs also participate in collision detection, forwarding a jam signal to all ports if a collision is detected.

The EDM module 152 interacts and manages data in the databases of instances associated with TransACT™ and FUSION. The communication module 450 also includes an inter-switch link 415 that includes an inter-switch link queue 470 and an advertiser service 475. The media management system 480 associated with the EDM system 400 can include a radio fusion engine 485, a media database 490, and an EBS (Enterprise Bus Service) 495. In general, a fusion enabled entity can be stored in the radio fusion engine 485. Other entities can be stored in advertiser services 475 associated with the communication module 450. A new advertiser/agency can be required to be matched by the EDM module 152 and assigned a unique enterprise ID. Any key changes to the advertiser/agency records require that the record(s) be re-matched and re-assigned and assigned a new enterprise ID.

If a record to be re-matched is received from the advertiser service 475, the hub database 445 can scan the advertiser ID and/or fusion ID associated with the record and update, for example, the name, revenue type or industry code for the record. The changes with respect to the record can be automatically updated in the hub database 445 based on the advertiser ID/fusion ID and therefore when the user 440 logs into the EDM module 152, the changes can be visible. Additionally, when the advertiser service 475 transmits a record to be reassessed to the hub 460, it also transmits an 'Old Enterprise ID' in a response message which can be helpful for the user 440 to re-match the entity record. The proposals for advertisers/agents can be created in the radio fusion engine 485 for fusion enabled markets, and once the proposal becomes an order, the records associated with the advertiser/agent can be moved from the advertiser service 475.

The EDM module 152 can pull the records from the advertiser services 475 and the radio fusion engine 485 utilizing a windows service (e.g., DPEDM) at regular time intervals. The advertiser services 475 and the radio fusion engine 485 provide a response message that includes unmatched entity records with respect to the user request. The user 440 can further match the advertisers/agents with their respective enterprise entities and store the records into the media database 490 associated with the media management system 480. The media database 490 includes a 'tAdvertiser' and a 'tAgency' table that can be employed to store the advertiser and agent records individually. If a record exists in both fusion engine 485 and the advertiser service 475, then the scores of both records can be combined in order to ensure that each entity can possess a single score. All retrieved records can be further prioritized based on the associated score in the media database 490. The records with the highest score can be provided with a highest priority and assigned to a parent enterprise advertiser/agency.

Figure 5:
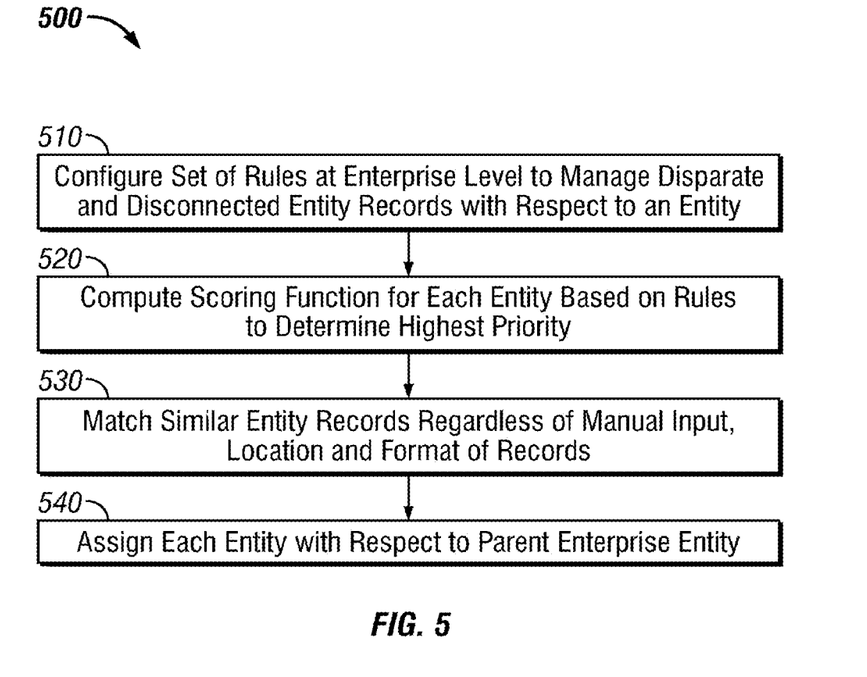
FIG. 5 illustrates a high-level flow chart of operations illustrating logical operational steps of a method for managing media advertising enterprise data, in accordance with the disclosed embodiments.

FIG. 5 illustrates a high-level flow chart of operations illustrating logical operational steps of a method 500 for managing media advertising enterprise data, in accordance with the disclosed embodiments. It can be appreciated that each of the steps or logical operations of the method 500 depicted in FIG. 5 can be implemented by executing a program instruction or a group of instructions in the data-processing system 100. The instructions depicted in FIG. 5 can be provided by, for example, a module or group of modules, as discussed earlier herein.

The EDM system 400 can be an automated system that selects the advertisers/agents to match and provides a list of possible matches. The user 440 can further make a final decision to match the advertiser/agency or to add it as a new enterprise advertiser/agency in the EDM system 400. Unmatched advertisers/agencies can be presented utilizing a ranking system that permits the user 440 to match advertisers with the highest revenue or market ranking. The system 400 can provide accurate reporting of advertiser records that is required for better management decisions and, therefore, enterprise advertiser information can be as reliable as possible.

A set of rules can be configured at an enterprise level to manage the disparate and disconnected market entity records, as depicted at block 510. A scoring function can be computed for each entity (advertiser/agency) associated with the EDM system 400 based on the rules in order to determine a highest priority, as illustrated at block 520. The similar entity records can be matched regardless of manual input location and format of the entity records, as indicated at block 530. Thereafter, each entity can be assigned to a parent enterprise entity, as illustrated at block 540. The method and system described herein can therefore provide an optimization mechanism for interactively managing and reporting market entity records at the enterprise level in a simple and efficient manner. The enterprise advertiser is the parent advertiser for identical advertisers in the markets. The advertiser can be created in the EDM system 400, and the like market advertisers can be linked to it. The enterprise advertiser's order information from multiple markets can be consolidated for enterprise reporting once a link has been set up.

Figure 6:
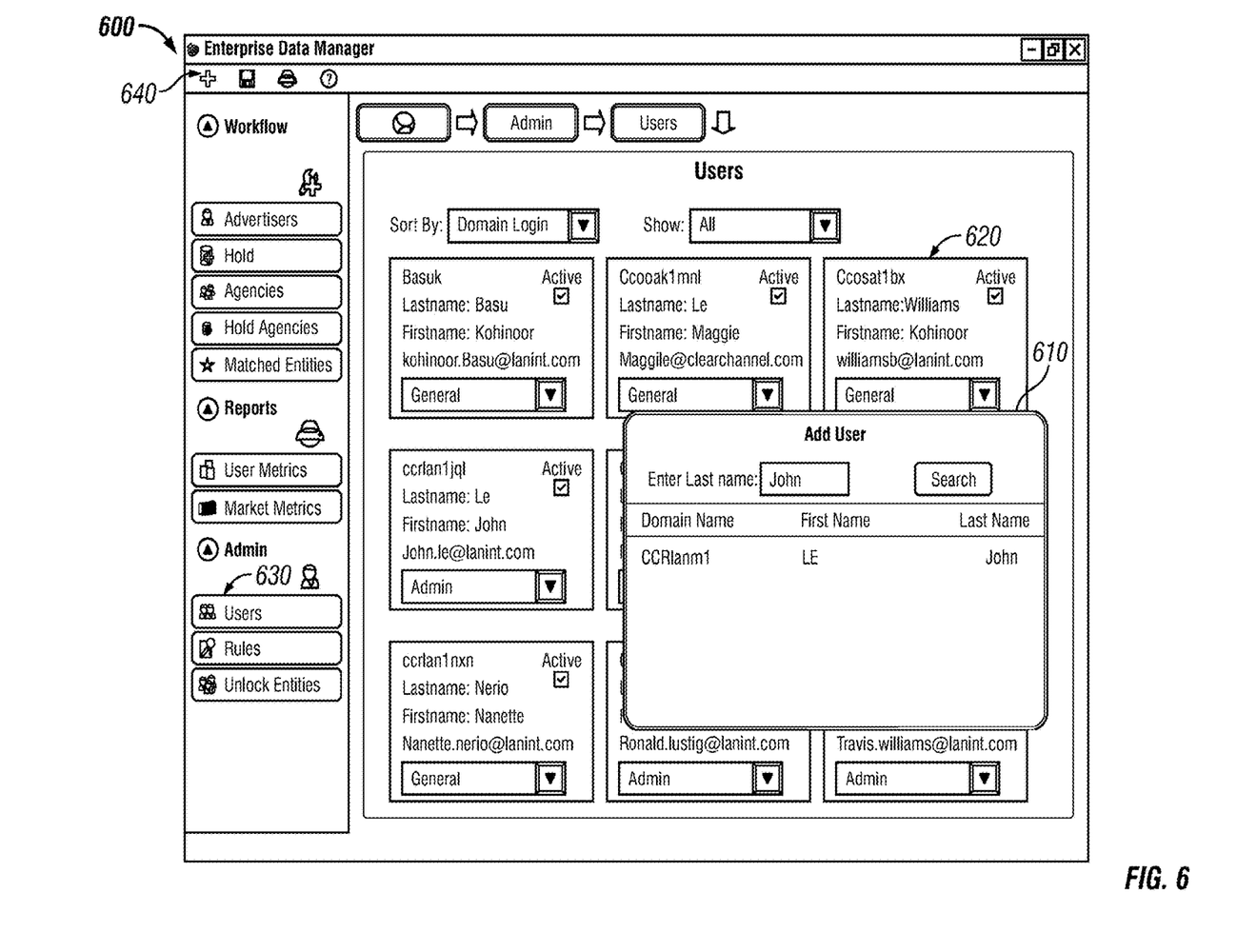
FIG. 6 illustrates a graphical user interface that displays user information associated with the EDM system, in accordance with the disclosed embodiments.
Figure 8:
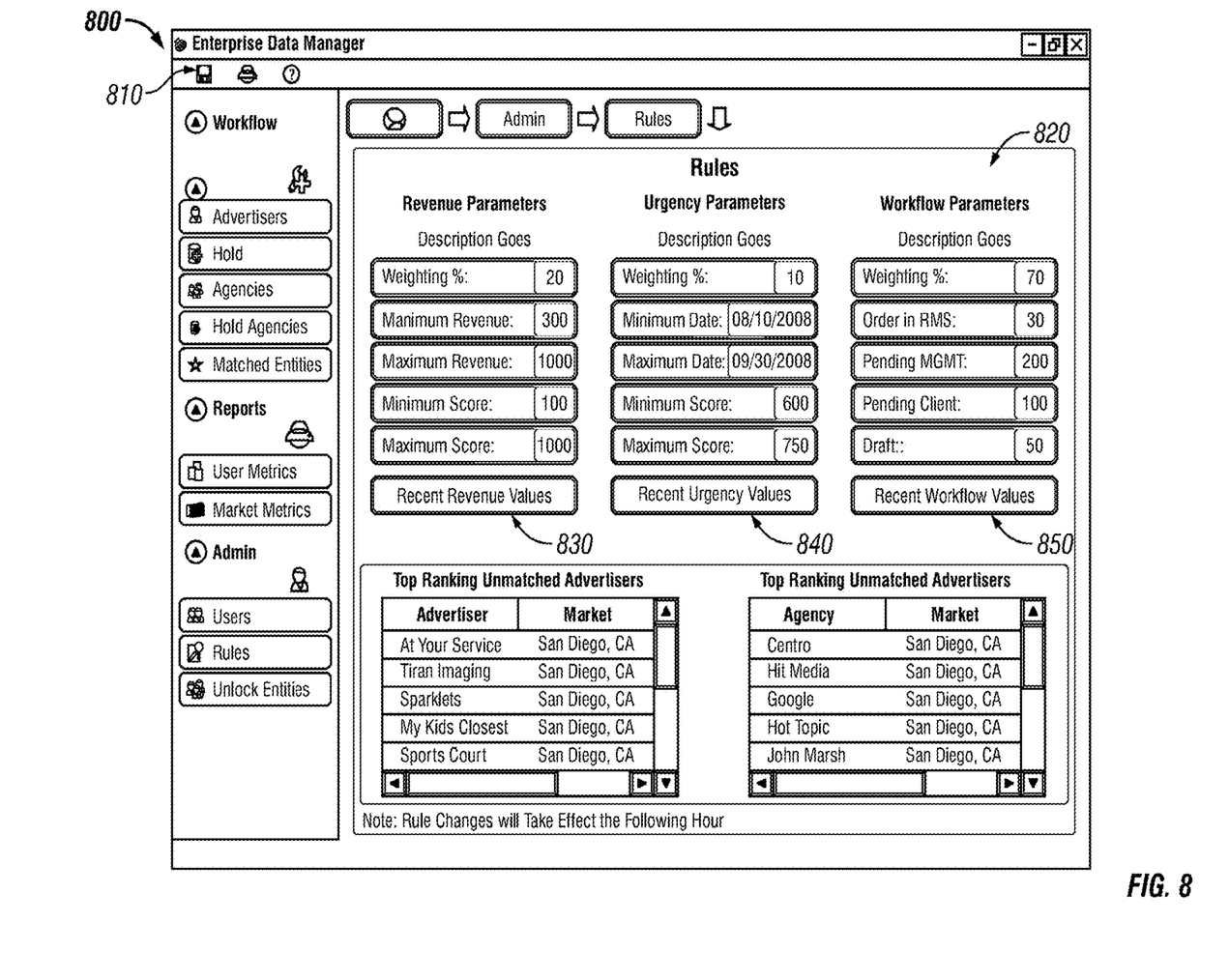
FIG. 8 illustrates a graphical user interface that displays rules information associated with the EDM system, in accordance with the disclosed embodiments.

FIG. 6 illustrates a GUI (Graphical User Interface) 600 that displays user information associated with the EDM system 400, in accordance with the disclosed embodiments. Note that the user interface or GUI 600 and/or 800 may be implemented utilizing a GUI such as, for example, the GUI 153 depicted in FIG. 1 herein, and may be provided by a module such as, for example, module 154 (i.e., a software application). GUI 600 and/or 800 can be displayed via a display device such as, for example, the monitor 106 depicted in FIG. 1.

GUI 600 and 800 can be implemented in the context of a GUI "window". Note that in computing, a GUI "window" is generally a visual area containing some type of user interface (e.g., GUI 153). Such a "window" usually (but not always) possesses a rectangular shape, and displays the output of and may allow input to one or more processes. Such windows are primarily associated with graphical displays, which can be manipulated with a mouse such as, for example, the input device 105 depicted in FIG. 1. A GUI using "windows" as one of its main "metaphors" is often referred to as a windowing system.

An EDM administrator can access GUI 600 to manage users and monitor activity. The GUI 600 can include functions such as, for example, to view existing EDM user information, add new users to access the EDM module, deactivate an active EDM user, and assign security privileges for each individual EDM user. The GUI 600 displays user cards such as a card 620 for all the existing EDM users in association with their details by accessing an icon 630. If the user "clicks" the icon 630, the GUI 600 provides information associated with the user. The user information can include, for example, domain login (usually with CCR followed by four digit code for the market and end with user's initials), first name, last name, email, role (admin or general), and active information. When displaying a user record, most information can be transferred from the user's employee record to the EDM module 152.

The employee information can be retrieved through the gatekeeper service 420 using a 'BulkGetUsers' web method. The 'BulkGetUsers' web method returns all the user records. EDM module 152 can run a daily process to acquire the data from the gatekeeper service 420 and store the data in the 'tUserSetting' table associated with the EDM user database 430. The active EDM users and their details can only be displayed on the GUI 600. If the user "clicks" the add icon 640, the GUI 600 displays a graphical "pop-up" window 610 that permits an administrator to add new users. The 'add user' pop-up window 610 provides an option to search users by last name and add them to the list of active users that are authorized to use the EDM module 152. Once the user has been added to the list of active EDM users, they can be assigned a role such as admin or general in order to determine the level of access to the application.

Figure 7:
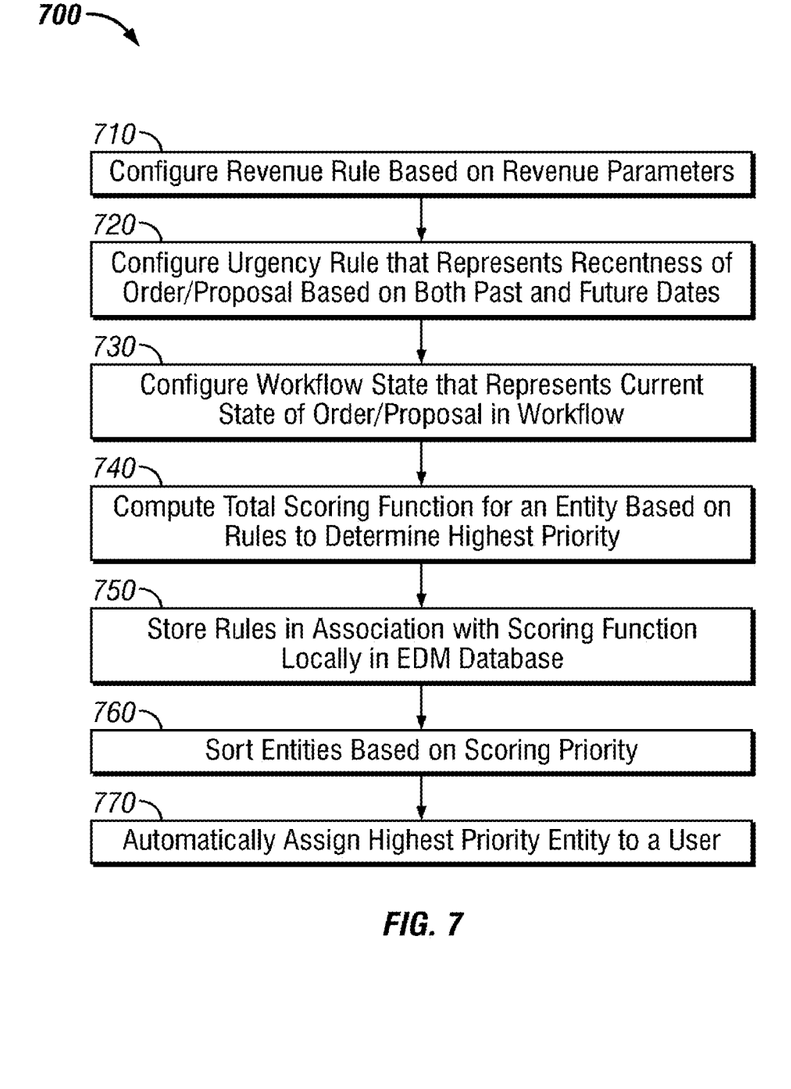
FIG. 7 illustrates a high-level flow chart of operations illustrating logical operational steps of a method for configuring a set of rules to manage disparate and disconnected records, in accordance with the disclosed embodiments.

FIG. 7 illustrates a high-level flow chart of operations illustrating logical operational steps of a method 700 for configuring a set of rules at an enterprise level to manage disparate and disconnected records, in accordance with the disclosed embodiments. The scoring rules provide an automated means of ensuring that most important entities are considered first within an enterprise reporting. The rules can be defined based on key factors such as amount of revenue, recentness of the order/proposal, and workflow state. The rules determine the scoring of an unmatched entity, and each entity has an associated score which can determine its priority. The EDM module 152 can be designed to automatically assign the highest priority entity to a user.

A revenue rule with respect to an entity can be configured based on revenue parameters, as illustrated at block 710. For example, if an advertiser/agency possesses a proposal or order which has the highest dollar amount, then that advertiser/agency will be assigned the highest score. As the revenue for the advertiser/agency goes down via a linear scale of $0 to $100,000, then the score attached falls down linearly from 0 to 1000. The configurable revenue parameters can be, for example, minimum revenue, maximum revenue, minimum score, maximum score, weighting percentage, etc. An administrator can be authorized with the ability to change these parameters based on the business priority. The changes to the parameters can impact the scoring of the advertiser/agency.

The urgency rule that represents recentness of an order or proposal can be configured based on both past and future dates, as indicated at block 720. For example, an order that will be playing in the next two days can be assigned a higher score compared to the order that would play in a month. Similarly, the orders that played a few days ago can have a higher score than the ones that played a month ago. The urgency parameters that impact the scoring of an advertiser are minimum date, maximum date, minimum score, maximum score, and weighting percentage.

An urgency score for a past order can be calculated, as shown in equation (1).

$$\text{Max Value} - \text{Min Value}/(\text{Today's Date} - \text{Min Date}) = V1 \quad (1)$$
$$\text{Max Value} - [V1^*(\text{Today's Date} - \text{End Date of Order})] = V2$$
$$V2^*\text{Weighting} = \text{Score}$$

The urgency score for a future order can be calculated, as indicated in equation (2).

$$\text{Max Value} - \text{Min Value}/(\text{Max Date} - \text{Today's Date}) = V1 \quad (2)$$
$$\text{Max Value} - [V1^*(\text{Start Date of Order} - \text{Today's Date})] = V2$$
$$V2^*\text{Weighting} = \text{Score}$$

The workflow state that represents a current state of the order/proposal in a workflow can be computed, as illustrated at block 730. The workflow state represents a current state of the order/proposal in a VIERO®/FUSION workflow. For example, the workflow state exist in FUSION can be, for example, draft, pending client approval, pending management approval, etc. When the order is injected in a software application/module such as, for example, VIERO®, then the workflow state can be order in RMS. The scores can be assigned to each of these workflow states and the weighting for the workflow state can be configured.

A total scoring function with respect to the entity can be computed based on the rules in order to determine the entity with a highest priority, as illustrated at block 740. The rules in association with the scoring function can be stored locally in the advertiser database 430, as depicted at block 750. The advertiser/agency data can be pulled from a software application/module such as, for example, VIERO®/FUSION on an hourly and nightly basis. The current rules that are stored in the database 430 can be sent in a request message by the hub 460 to the media management system 480. The media management system 480 can calculate the scores for all the advertisers/agencies based on the rules provided in the request message by the hub 460. The calculated score along with the other advertiser/agency information can be sent back to the hub 460 in the response message. The advertiser/agency can be sorted based on a scoring priority, as indicated at block 760. The user can be automatically assigned with a highest priority advertiser/agency, as illustrated at block 770.

The exemplary set of rules depicted in TABLE. 1 can be applied to advertisers and agencies and the rules can be based on proposals and orders that are received from the advertisers. The bolded items can be configurable at the enterprise level. The numbers and values provided in TABLE. 1 are suggested initial values. The scoring can be accomplished separately by, for example, FUSION and transACT software applications and/or other appropriate software modules. If multiple applications return data for the same advertiser during a data pull operation, the HUB 460, which is the centralized system that interfaces and interconnects with the disparate disconnected media management system 480, can determine which data set can be employed to act as the enterprise record set. If an advertiser has more than one proposal or order that falls within the urgency time-frame (a time period in which the advertiser wishes to advertise), each proposal/order can be scored separately and then each proposal and subsequent order can be summed. The FUSION and transACT applications can communicate the sum of the advertiser-proposal and subsequent order scores to the HUB 460. New advertisers that are entered without a proposal or order can have an initial score of 0.

TABLE 1

| Weighting | Rule | Min Value | Max Value | Min Score | Max Score |
|---|---|---|---|---|---|
| 90 | Value of Proposal/Order | $0 | $100,000 | 0 | 1000 |
| 5 | Urgency: Time from last Day of Order/Time to First Day of Order | Past Calendar Date | Future Calendar Date | 0 | 1000 |
| 5 | Workflow States → Workflow State | Draft 50 | Pending Client 100 | Pending Mgmt 200 | Order in RMS 400 |

For example, consider company X which is an existing advertiser with $650,000 in revenue (total cost) for an order that possess an end date of Aug. 24, 2008. Further, assume a current date of Aug. 25, 2008 and an urgency time-frame with an urgency window having a Jan. 1, 2008 minimum and Dec. 31, 2008 maximum. The revenue can be calculated utilizing a linear scale of range from 0-$100K. The revenue score can be calculated as indicated in equation (3) as follows:

$$1000(\text{max score}) - 0(\text{min score})/100000(\text{max value}) - 0(\text{min value}) = \quad (3)$$
$$.01(\text{read as } 1/100 \text{ or } 1 \text{ point for every } \$100)$$
$$\$650{,}000 \text{ in revenue} = 1000 \text{ points} \times 90 \text{ weighting} = 90{,}000 \text{ points}$$

The calculation for revenue employs 1000 points because it has reached and surpassed the maximum value of $100,000. The urgency score can be calculated utilizing the equations (1) and (2) as follows.

$$1000(\text{max value}) - 0(\text{min value})/238(\text{total number of days between} \quad (4)$$
$$\text{today's date and the min date}) = 4(V1)$$
$$1000(\text{max value}) - [4(V1)^*1(\text{today's date} \sim \text{end date})] = 996(V2)$$
$$996(V2)^*5 = 4980 \text{ points}$$

The workflow state can be an order in RMS and can be calculated as illustrated below in equation (5).

$$400 \text{ point} \times 5 \text{ weighting} = 1500 \text{ point} \quad (5)$$

Hence the total score can be calculated as indicated in equation (6) as follows:

$$90{,}000 + 4980 + 1{,}500 = 96{,}480 \quad (6)$$

Consider another example wherein "Scott's Shirts," which is a new advertiser with a proposal in place with a pending review by management that is worth $5,000 (total cost) and is scheduled to run on Aug. 28, 2008. The current date is Aug. 25, 2008 and the urgency time-frame is Jan. 1, 2008 at a minimum and Dec. 31, 2008 at a maximum. The new order placed with value of order can be calculated utilizing a linear scale of range from 0-$100K. The revenue score can be calculated as indicated in equation (7) as follows:

$$1000(\text{max score}) - 0(\text{min score})/100000(\text{max value}) - 0(\text{min value}) = \quad (7)$$
$$.01(\text{read as } 1/100 \text{ or } 1 \text{ point for every } \$100)$$
$$\$5{,}000 \text{ order} = 50 \text{ points} \times 90 \text{ weighting} = 4{,}500$$

The urgency can be calculated utilizing the equations (1) and (2) as follows.

$$000(\text{max value}) - \quad (8)$$
$$0(\text{min value})/129(\text{total number of days between the}$$
$$\text{max date and today's date}) = 8(V1)$$
$$1000(\text{max value}) - [8(V1)^*3(\text{start date} \sim \text{today's date})] = 976(V2)$$
$$976(V2)^*5 = 4880 \text{ points}$$

The workflow state can be an order in RMS and can be calculated as illustrated below in equation (9).

$$\text{Review by Management} = 200 \text{ points} \times 5 \text{ weighting} = 1{,}000. \quad (9)$$

Hence the total score can be calculated as indicated in equation (10) as follows:

$$4{,}500 + 4{,}880 + 1{,}000 = 10{,}480 \quad (10)$$

The total score can be employed to rank the entity with other entities and to determine the order in which it appears for matching. The higher the order, the sooner the entity can be selected to appear in a workflow screen. Example default values for the scoring parameters are illustrated in TABLE 2:

TABLE 2

| Rules | Configuration Parameters | Default Values |
|---|---|---|
| Revenue Parameters | Weighting % (a) | 75% |
| | Minimum Revenue | 0 ($) |
| | Maximum Revenue | 10 Million ($) |
| | Minimum Score | 0 |
| | Maximum Score | 1000 |
| Urgency Parameters | Weighting % (b) | 20% |
| | Minimum Date | Jan. 01, 2007 |
| | Maximum Date | Dec. 31, 2008 |

TABLE 2-continued

| Rules | Configuration Parameters | Default Values |
|---|---|---|
| | Minimum Score | 0 |
| | Maximum Score | 1000 |
| Workflow Parameters | Weighting % (c) | 5% |
| | Order in RMS | 400 |
| | Pending Management | 200 |
| | Pending Client | 100 |
| | Draft | 50 |

Example boundary values for the scoring parameters are illustrated in TABLE. 3 below.

TABLE 3

| Rules | Configuration Parameters | Min Limit | Max Limit |
|---|---|---|---|
| Revenue Parameters | Weighting % (a) | 0% | 100% |
| | Minimum Revenue | >=0 ($) | <10 Million ($) |
| | Maximum Revenue | >0 ($) | >=10 Million ($) |
| | Minimum Score | >=0 | <1000 |
| | Maximum Score | >0 | <=1000 |
| Urgency Parameters | Weighting % (b) | 0% | 100% |
| | Minimum Date | Current Date −5 Yrs | Current Date +5 yrs |
| | Maximum Date | Current Date −5 Yrs | Current Date +5 yrs |
| | Minimum Score | >=0 | <1000 |
| | Maximum Score | >0 | <=1000 |
| Workflow Parameters | Weighting % (c) | 0% | 100% |
| | Order in RMS | >=0 | <=1000 |
| | Pending Management | >=0 | <=1000 |
| | Pending Client | >=0 | <=1000 |
| | Draft | >=0 | <=1000 |

FIG. 8 illustrates a GUI 800 that displays rules information associated with the EDM system 400, in accordance with the disclosed embodiments. As indicated in FIG. 8, the graphical user interface 800 functions as a graphically displayed rules screen that permits an administrator to manage the rules which drive the scoring of an advertiser/agency or other entity. An administrator can utilize the GUI 800 to, for example, modify the configuration parameters 820 associated with each rule. The parameters 820 such as weighting percentage, minimum revenue, maximum revenue, minimum score, maximum score, minimum date, maximum date, etc., are user input text fields. The user can implement the required changes via the GUI 800 and select a 'Save' icon 810 in the toolbar associated with the GUI 800. The 'Recent Revenue Values', 'Recent Urgency Values', 'Recent Workflow Values' buttons 830, 840, and 850 permit a user to reset the individual parameter values to the last saved values in the database 430. If the user attempts to navigate to another graphical user interface screen without saving the changes or close the GUI user 800, then a "pop up" can be graphically displayed via the GUI 800.

The user interface 600 and 800, in association with the EDM module 152, provide a unique and innovative approach for storing, retrieving, and manipulating data from existing databases containing media-related data. By utilizing the database with a simplified storage and retrieval protocol, data contained therein can be effectively manipulated in real time. The disclosed graphical user interface 800 can provide access to significantly reducing training time. The EDM module 152 can provide a team of users with the ability to match duplicate advertiser and agency records to one master record. The system 400 provides a seamless path for "isolated" or distributed media records to integrate into a common ad management and display.

While the present invention has been particularly shown and described with reference to a preferred embodiment, it will be understood by those skilled in the art that various changes in form and detail can be made therein without departing from the spirit and scope of the invention. Furthermore, as used in the specification and the appended claims, the term "computer" or "system" or "computer system" or "computing device" includes any data processing system or apparatus including, but not limited to, personal computers, servers, workstations, network computers, main frame computers, routers, switches, a Personal Digital Assistants (PDA), cellular telephones, Smartphones, and/or any other system/device capable of processing, transmitting, receiving, capturing and/or storing data.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A data processing system comprising:
a processor and associated memory implementing an enterprise data management (EDM) module configured to interact with an enterprise management system;
a storage device coupled to the processor, the storage device implementing an enterprise data management (EDM) database, the EDM database configured to store priority rules used to determine priority scores associated with a plurality of different entities associated with entity records;
a communications interface coupled to the processor, the communications interface configured to:
transmit the priority rules, to an enterprise management system;
receive priority scores of individual entities of the plurality of different entities from the enterprise management system, wherein the priority scores are determined based on the priority rules;
the storage device further configured to store, in the EDM database, the priority scores of the individual entities in association with the priority rules; and
the processor and associated memory configured to use the EDM module to match the entity records to entities, wherein in the entity records are matched in an order determined, based at least in part, on the priority scores of the individual entities.

2. The data processing system of claim 1, wherein the priority rules include one or more of a revenue parameter, an urgency parameter, and a workflow parameter.

3. The data processing system of claim 1, wherein different priority rules are assigned different weights.

4. The data processing system of claim 1, wherein the EDM module is further configured to obtain priority-rule modifications via user input into a graphical user interface (GUI).

5. The data processing system of claim 4, wherein the EDM module applies the user input obtained from the GUI to match duplicate entity records to a single master record.

6. The data processing system of claim 4, wherein the EDM module applies the priority-rule modifications at an enterprise level.

7. The data processing system of claim 1, wherein the EDM module is further configured to:
link information associated with a first order placed by an advertiser in a first markets with a second order placed by the advertiser in a different market.

8. A method comprising:
implementing, by a processing device including a processor and associated memory, an enterprise data management (EDM) module configured to interact with an enterprise management system;
storing priority rules in an enterprise data management (EDM) database implemented at a storage device, wherein the priority rules determine priority scores associated with a plurality of different entities associated with entity records;
transmitting the priority rules to an enterprise management system;
receiving priority scores of individual entities of the plurality of different entities, from the enterprise management system, wherein the priority scores are determined based on the priority rules;
storing, in the EDM database, the priority scores of the individual entities in association with the priority rules; and
matching the entity records to entities based using the EDM module, where an order in which the entity records are matched is determined, based at least in part, on the priority scores of the individual entities.

9. The method of claim 8, wherein the priority rules include one or more of a revenue parameter, an urgency parameter, and a workflow parameter.

10. The method of claim 8, further comprising:
assigning different priority different weights.

11. The method of claim 8, further comprising:
obtaining priority-rule modifications via user input into a graphical user interface (GUI).

12. The method of claim 11, further comprising:
matching duplicate entity records to a single master record by applying the user input obtained from the GUI.

13. The method of claim 11, further comprising:
applying the priority-rule modifications to the entity records at an enterprise level.

14. The method of claim 8, further comprising:
linking information associated with a first order placed by an advertiser in a first markets with a second order placed by the advertiser in a different market.

15. A device comprising:
a processor;
memory coupled to the processor;
a communications interface coupled to the processor and to the memory;
the processor implementing an enterprise data management (EDM) module configured to:
interact with an enterprise management system;
store priority rules in an enterprise data management (EDM) database, wherein the priority rules determine priority scores associated with a plurality of different entities associated with entity records;
the communications interface configured to:
transmit the priority rules, to an enterprise management system;
receive priority scores of individual entities of the plurality of different entities from the enterprise management system, wherein the priority scores are determined based on the priority rules;
the EDM module further configured to:
store, in the EDM database, the priority scores of the individual entities in association with the priority rules; and
match the entity records to entities in an order determined, based at least in part, on the priority scores of the individual entities.

16. The device of claim 15, wherein the priority rules include one or more of a revenue parameter, an urgency parameter, and a workflow parameter.

17. The device of claim 15, wherein different priority rules are assigned different weights.

18. The device of claim 15, wherein the EDM module is further configured to obtain priority-rule modifications via user input into a graphical user interface (GUI).

19. The device of claim 18, wherein the EDM module applies the priority-rule modifications at an enterprise level.

20. The device of claim 15, wherein the EDM module is further configured to:
link information associated with a first order placed by an advertiser in a first markets with a second order placed by the advertiser in a different market.

* * * * *